US011466562B2

(12) United States Patent
Hagen

(10) Patent No.: US 11,466,562 B2
(45) Date of Patent: Oct. 11, 2022

(54) ELECTRONIC SENSING OF DISCONTINUITIES IN A WELL CASING

(71) Applicant: HALLIBURTON ENERGY SERVICES, INC., Houston, TX (US)

(72) Inventor: Trond Hagen, Sandefjord (NO)

(73) Assignee: Halliburton Energy Services, Inc., Houston, TX (US)

(*) Notice: Subject to any disclaimer, the term of this patent is extended or adjusted under 35 U.S.C. 154(b) by 564 days.

(21) Appl. No.: 16/473,183

(22) PCT Filed: Jun. 28, 2018

(86) PCT No.: PCT/US2018/040054
§ 371 (c)(1),
(2) Date: Jun. 24, 2019

(87) PCT Pub. No.: WO2020/005259
PCT Pub. Date: Jan. 2, 2020

(65) Prior Publication Data
US 2021/0340862 A1 Nov. 4, 2021

(51) Int. Cl.
E21B 47/092 (2012.01)
G01V 3/26 (2006.01)
(52) U.S. Cl.
CPC .............. E21B 47/092 (2020.05); G01V 3/26 (2013.01)
(58) Field of Classification Search
CPC ...... E21B 17/003; E21B 47/09; E21B 47/092; E21B 47/13; G01V 3/26
See application file for complete search history.

(56) References Cited

U.S. PATENT DOCUMENTS 2,350,832 A * 6/1944 Segesman ............... E21B 47/09
324/368
2,554,844 A * 5/1951 Swift .................... E21B 47/092
340/854.2
(Continued)

FOREIGN PATENT DOCUMENTS

CN 108019206 A * 5/2018
WO 2006099133 A1 9/2006
(Continued)

OTHER PUBLICATIONS

PCT/US2018/040054, "International Search Report and Written Opinion", dated Mar. 27, 2019, 15 pages.

Primary Examiner — Jennifer H Gay
(74) Attorney, Agent, or Firm — Kilpatrick Townsend & Stockton LLP

(57) ABSTRACT

Detecting discontinuities in a well casing according to some aspects includes actively monitoring the electric current response in an antenna or in antennas during the insertion of a tubing string. The method does not require permanent magnets, or any hardware elements beyond those that are already present in a typical behind-casing measurement system. A system according to some aspects includes an antenna that is mounted in or on a tubing string and a voltage source that can be connected to the antenna. A processing device is connected to the antenna and the voltage source. The processing device applies an AC voltage to the antenna and monitors a current generated in the antenna while the AC voltage is being applied.

17 Claims, 5 Drawing Sheets

(56) References Cited

U.S. PATENT DOCUMENTS

| | | | | |
|---|---|---|---|---|
| 2,768,684 | A | * | 10/1956 | Castel .................. E21B 47/092 340/854.2 |
| 2,782,365 | A | * | 2/1957 | Castel .................. E21B 47/092 324/221 |
| 2,897,440 | A | * | 7/1959 | Hawthorne ........... E21B 47/092 324/221 |
| 2,934,697 | A | * | 4/1960 | Hawthorne ........ G01N 27/9093 324/221 |
| 2,967,994 | A | * | 1/1961 | Peterson ............... E21B 47/092 324/221 |
| 3,007,109 | A | * | 10/1961 | Swift ....................... G01V 3/26 324/221 |
| 3,431,488 | A | * | 3/1969 | De La Torre ............ G01V 3/26 340/854.2 |
| 3,513,912 | A | * | 5/1970 | Boop .................... E21B 43/119 166/66.5 |
| 3,570,594 | A | * | 3/1971 | Hamilton ............... G01N 27/82 166/64 |
| 4,023,092 | A | * | 5/1977 | Rogers .................... E21B 47/12 324/221 |
| 4,320,340 | A | * | 3/1982 | Lichtenberg .......... E21B 47/092 324/221 |
| 4,568,933 | A | * | 2/1986 | McCracken ............ E21B 47/10 340/855.3 |
| 4,572,293 | A | * | 2/1986 | Wilson .................. E21B 47/092 166/250.01 |
| 5,720,345 | A | * | 2/1998 | Price ........................ G01B 7/28 166/254.2 |
| 6,768,299 | B2 | | 7/2004 | Almaguer |
| 7,095,223 | B2 | * | 8/2006 | Yoo ....................... E21B 47/092 324/221 |
| 8,365,825 | B1 | * | 2/2013 | Yarbro .............. E21B 43/11857 166/297 |
| 9,359,884 | B2 | | 6/2016 | Hallundbæk et al. |
| 9,598,954 | B1 | * | 3/2017 | Zhang .................. E21B 47/092 |
| 9,798,035 | B2 | * | 10/2017 | Fouda ..................... G01V 3/18 |
| 10,338,030 | B2 | * | 7/2019 | Bittar ..................... G01N 27/82 |
| 10,920,578 | B2 | * | 2/2021 | San Martin ........... E21B 17/042 |
| 2002/0145423 | A1 | * | 10/2002 | Yoo ........................ G01N 27/82 324/221 |
| 2004/0239521 | A1 | * | 12/2004 | Zierolf .................. E21B 17/006 340/854.1 |
| 2009/0078413 | A1 | * | 3/2009 | Tubel ...................... E21B 47/09 166/255.1 |
| 2009/0101337 | A1 | | 4/2009 | Neidhardt |
| 2009/0166035 | A1 | * | 7/2009 | Almaguer ............... E21B 29/00 166/254.1 |
| 2010/0163224 | A1 | | 7/2010 | Strickland |
| 2011/0290011 | A1 | | 12/2011 | Dowla et al. |
| 2013/0249705 | A1 | * | 9/2013 | Sharp .................... E21B 47/135 340/854.7 |
| 2014/0216734 | A1 | * | 8/2014 | Hupp ...................... E21B 47/09 166/255.1 |
| 2015/0025805 | A1 | * | 1/2015 | Hanak ................... E21B 47/092 702/6 |
| 2015/0047839 | A1 | | 2/2015 | Godager et al. |
| 2015/0285069 | A1 | * | 10/2015 | Mann ..................... E21B 47/04 166/255.1 |
| 2015/0308980 | A1 | * | 10/2015 | Bittar ..................... E21B 47/00 73/152.54 |
| 2015/0346376 | A1 | * | 12/2015 | Fouda .................... G01V 3/18 324/338 |
| 2016/0168975 | A1 | | 6/2016 | Donderici et al. |
| 2016/0178579 | A1 | | 6/2016 | Donderici et al. |
| 2017/0138132 | A1 | * | 5/2017 | Wilson ................. E21B 47/092 |
| 2017/0298723 | A1 | * | 10/2017 | Flores Perez ............ G01V 3/26 |
| 2018/0058195 | A1 | * | 3/2018 | Clark ..................... E21B 47/092 |
| 2018/0238166 | A1 | * | 8/2018 | Yang .................... E21B 47/092 |
| 2020/0257014 | A1 | * | 8/2020 | Khalaj Amineh ....... G01V 3/30 |
| 2021/0340862 | A1 | * | 11/2021 | Hagen ................... E21B 47/007 |

FOREIGN PATENT DOCUMENTS

| | | | | |
|---|---|---|---|---|
| WO | WO-2007015087 | A1 | * | 2/2007 ........... E21B 47/092 |
| WO | WO-2020050815 | A1 | * | 3/2020 ............. E21B 47/13 |
| WO | WO-2020251522 | A1 | * | 12/2020 ............ E21B 47/09 |

* cited by examiner

ELECTRONIC SENSING OF DISCONTINUITIES IN A WELL CASING

TECHNICAL FIELD

The present disclosure relates generally to devices for use in well systems. More specifically, but not by way of limitation, this disclosure relates to electronic detection of discontinuities in a well casing during "run-in-hole" (RIH) operations.

BACKGROUND

For penetration-free behind casing measurements, electronic systems use antennas for power transfer and communication through the casing. The casing is normally fixed to the formation by cementing. Electronics in or on a tubing string can couple to and communicate with electronics outside the casing through the antennas. The electronics outside the casing is part of the casing assembly during run-in-hole and cementing and its position is fixed in the well when cemented. The electronics on the tubing string move up and down with the tubing. In order to make accurate behind-casing measurements, the position of the tubing-side antenna must be known so that the tubing-side antenna can be aligned with the electronics outside the casing.

For placement at the appropriate location within the length of the casing, permanent magnets, magnetic sensors, or a combination of these components can be added to the tubing string to sense changes in magnetic fields. These magnetic sensing devices need to be connected to appropriate electronics in order to process the signals generated by the changing magnetic fields. Such a magnetic sensing system only works if the tubing string is kept moving fast enough so that a signal caused by a changing magnetic field is strong enough to be accurately sensed in the presence of noise within the system.

DETAILED DESCRIPTION

Certain aspects of the present disclosure relate to the downhole placement of a tubing-string instrument such as the tubing-side portion of a behind-casing measurement system. Discontinuities (e.g., collar joints) in a well casing can be electronically detected and tracked by actively monitoring the electric current response in an antenna or in antennas during the insertion of the tubing string. Movement of the tubing string for the purpose of detecting a discontinuity can be avoided, and permanent magnets, or any hardware elements beyond those that are already present in a typical behind-casing measurement system, may not be required.

Aspects of this disclosure can provide for counting casing sections during RIH operations with the same equipment used for the antenna-based coupling of power and communication signals during operation of a measurement system. As opposed to systems using permanent magnets, coils or magnetic sensors to sense the changes in magnetic fields while passing by a discontinuity, the system evaluates induced changes in the electrical load of the antenna. In the case of a well with a casing, such discontinuities are typically casing collar joints.

A system according to some aspects includes an antenna that can be mounted in or on a tubing string and a voltage source that can be connected to the antenna. A processing device can be connected to the antenna and the voltage source. The processing device is operable to apply an AC voltage to the antenna using the voltage source and monitor a current generated in the antenna while the AC voltage is being applied to the antenna and while the tubing string is deployed within a well casing. The processing device senses a discontinuity in the well casing by detecting a difference between the current generated in the antenna when the antenna is proximate to the discontinuity and the current generated in the antenna when the antenna is not proximate to the discontinuity. The processing device can provide at least a relative position indication based on sensing the discontinuity. That is, the processing device can provide an indication that the system is near or not near a discontinuity.

In some aspects, the processing device can provide a depth derived from keeping a count of discontinuities passed when it can be assumed the discontinuities are collar joints and the length of a section of casing is known. In some aspects, the current generated in the antenna is monitored by measuring a voltage drop across a current sensing component such as a sensing resistor. In some aspects, the processing device is operable to control the voltage source to set a frequency of the AC voltage in accordance with the physical characteristics of the tubing string, the well casing, or both.

Figure 1:
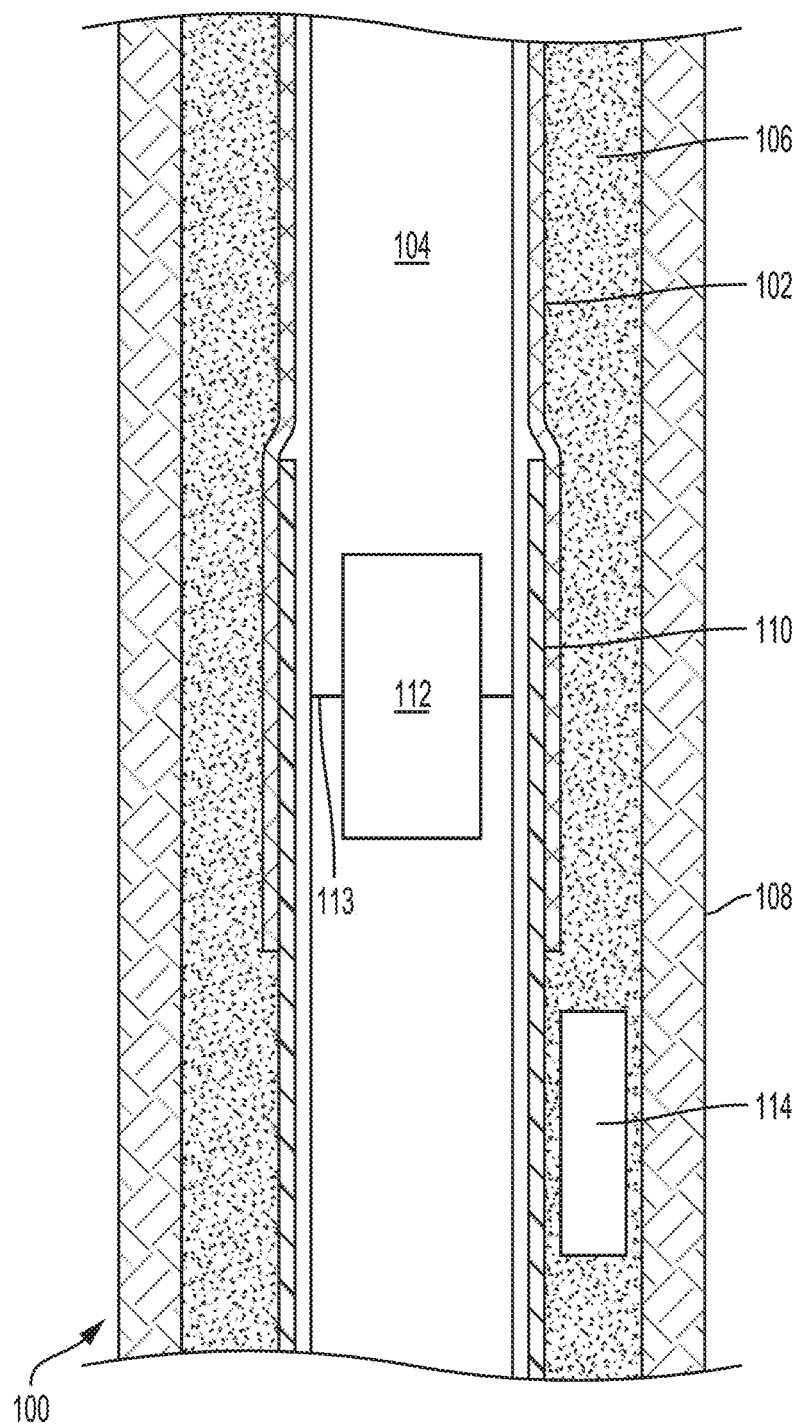
FIG. 1 is a cross-sectional view of a portion of a formation with a well that includes a well casing and a tubing string that includes a system according to some aspects.

FIG. 1 depicts an example of a portion 100 of a formation with an example well that includes a well casing 102 and a tubing string 104 that includes a system according to some aspects. Casing 102 is cemented in place by cement 106 disposed between well casing 102 and formation wall 108. The depicted portion of well casing 102 shown in FIG. 1 includes collar joint 110. Tubing-side electronics 112 is connected to one or more antennas 113 and is disposed in or on tubing string 104. In some aspects, the antenna or antennas 113 are on the outside of the tubing string, located coaxially relative to the outer diameter of the tubing. Behind-casing electronics 114 includes one or more antennas (not shown) that, in operation, couple with antennas in tubing-side electronics 112 to provide measurement data for the formation wall 108. A processing device that, in some aspects, implements discontinuity detection can be built into tubing-side electronics 112 or can be located remotely and connected to tubing-side electronics 112 through a cable or wireless connection. Such an arrangement enables discontinuities in the well casing such as collar joint 110 to be detected by the tubing-side electronics.

Tubing-side electronics 112 measures the load of an antenna or antennas by monitoring the electric current passing through the antenna while the antenna is being energized by an alternating current (AC) voltage. The frequency and amplitude of a signal generator can be tuned for optimal performance with respect to the type of antenna and the type of discontinuity to be detected. Using a square wave voltage (many simultaneous frequency components) may be advantageous but is not required. The shape of the current response may be used as a parameter for determining what the antenna is seeing, since different frequency components may respond differently in terms of load and phase. Using such a technique, differences in response along the string may be detected by referring to tally records. The position relative to the casing and the running velocity, if any, will influence the response. In systems with more than one tubing-side antenna, the system can compensate for the effect of velocity of the tubing string on the position indication, allowing the tubing string to be moved at a higher velocity if desired. However, motion is not required for the system to work. Once some readings have established antenna current levels, the instrument with the antennas and hence the tubing string can be moved to various positions and stopped, and proximity to a discontinuity can still be sensed with the system at rest.

Figure 2:
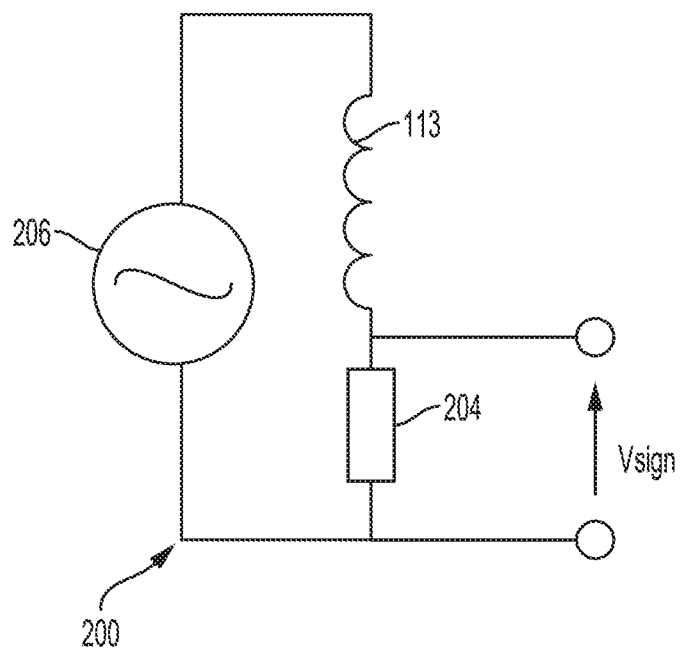
FIG. 2 is a schematic diagram that illustrates an equivalent circuit for monitoring current in an antenna according to some aspects.

FIG. 2 is a schematic diagram that illustrates an equivalent circuit 200 for monitoring current in an antenna according to some aspects. The current through the antenna 113, representing the electromagnetic load, is monitored by looking at the voltage drop $V_{sign}$ over a current sensing component, sensing resistor 204, with an AC signal generator 206 applying an AC voltage to the circuit. The current generated in the antenna 113 and hence the voltage drop across the sensing resistor 204 will vary and depend on the mass of magnetic or conductive material near the antenna 113. The absolute value of $V_{sign}$ by itself will not provide an indication that there is a discontinuity such as casing collar joint near the antenna, but the collar joints will produce a different value than the casing where there is no collar joint and a processing device can determine based on these values when the antenna 113 is in proximity to such a discontinuity. The changes in load of the antenna 113 are caused by changes in the magnetic field pattern. The signal generator, antenna, and resistor are typically included in behind-casing measurement systems for other purposes; therefore, in some cases, firmware or software can implement aspects of this disclosure without additional hardware.

Figure 3:
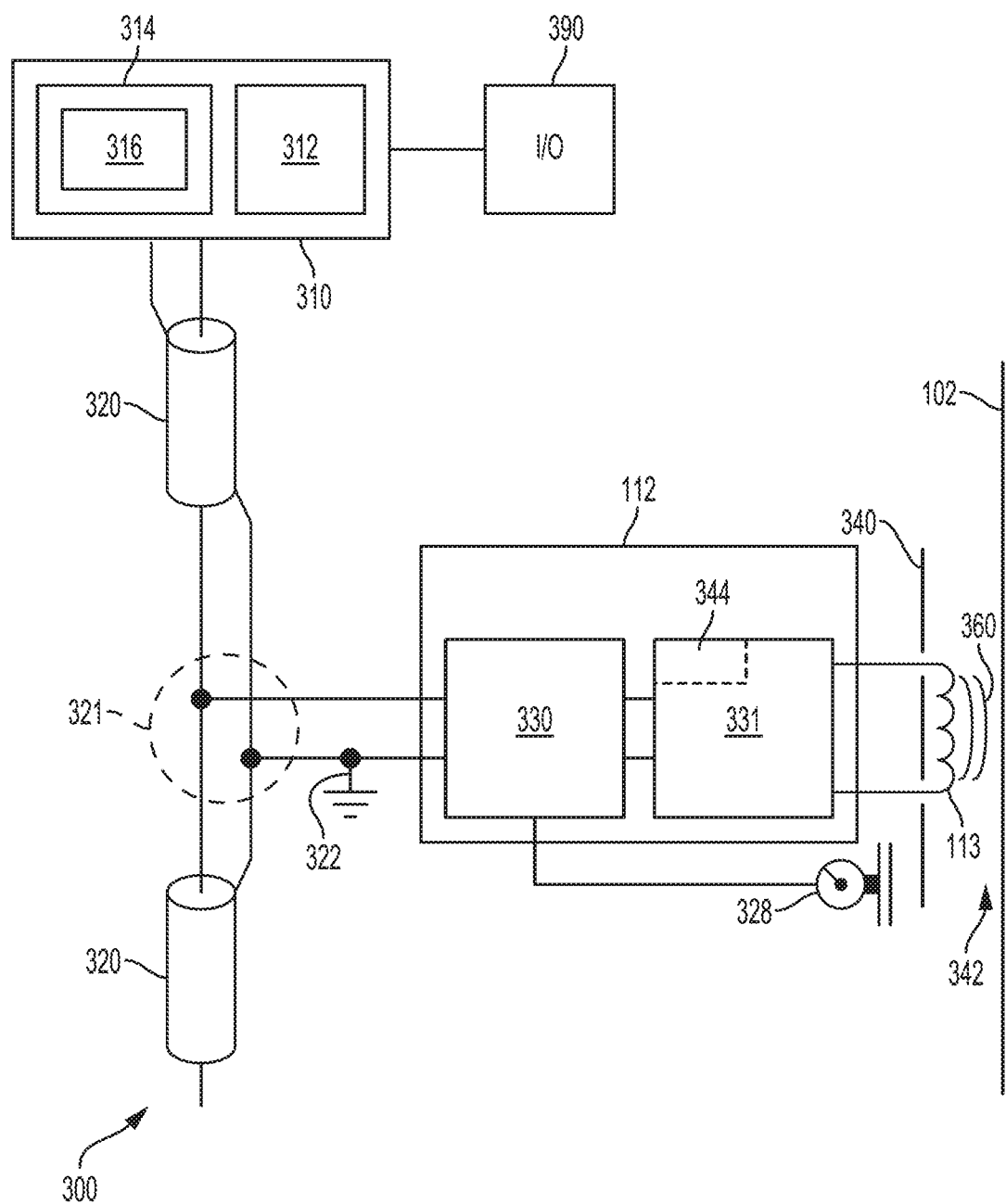
FIG. 3 is a block diagram of a system for sensing discontinuities in a well casing according to some aspects.

FIG. 3 is a block diagram of a system 300 for sensing discontinuities in a well casing according to some aspects. System 300 of FIG. 3 includes a topside controller 310, which in turn includes a processing device 312 and a non-transitory memory device 314 in which computer program code instructions 316 are stored for causing the processing device to control system 300 to carry out electronic sensing as described herein. The controller 310 is connected to tubing-side electronics 112 via transmission line 320 and a y-splitter 321. In some aspects, transmission line 320 is a tubing encapsulated cable ("TEC") and a local electrical ground 322 may be provided. The TEC cable may also provide power to the tubing-side electronics. Tubing-side electronics 112 includes interface module 330 with electronics to interface with the TEC, electronics to interface with any sensors that are part of the tubing-side instrument, and electronics to interface with the antenna driver. In this example, tubing-side electronics includes sensor 328. Tubing-side electronics 112 also includes driver module 331. In this example, interface module 330 and driver module 331 are on tubing 340 of the tubing string, which in turn is inside a well casing 102. Tubing 340 can be either magnetic or nonmagnetic. This arrangement creates annulus 342 between tubing 340 and well casing 102.

The well casing may be conductive and magnetic in regions other than in the regions where communication and power signals are to pass through the casing. In those regions, the casing section is made to be as non-magnetic and non-conductive as possible. When the example systems described herein are used for the purpose of communication through the casing, they will typically be adjacent to non-magnetic casing. But when used for the purpose of sensing discontinuities, the systems can be used during tubing RIH operations for detecting discontinuities in a magnetic casing. When entering into a region where there are casing side instruments, the discontinuity detection feature will clearly detect these instruments since the casing segment in such a region is non-magnetic. Such discontinuities will in fact be easier to detect than collar joints, which are typically of the same material as the casing itself.

Driver module 331 of system 300 includes the antenna driver, the data transmitter, the data receiver, and the power amplifier for the antenna 113. Driver module 331 can optionally include a signal improvement filter 344. The signal improvement filter may be beneficial for easier detection of the interesting parts of the response signal picked up by antenna 113. Signal improvement filter 344, as examples, may be a noise filter, low-pass filter, or high-pass filter. The signal generator used by processing device 312 as a voltage source to apply the AC voltage to the antenna and the sense resistor used to monitor the current generated in the antenna while the AC voltage is being applied are also located in the driver module 331. In some aspects, processing device 312 can set a frequency of the AC voltage being applied to antenna 113 in accordance with the physical characteristics of the tubing string, the well casing, or both.

Still referring to FIG. 3, antenna 113 is mounted in this example on the outside of tubing 340 in annulus 342. When the system is used for data communication or power transfer, tubing-side antenna 113 links with a behind-casing antenna (not shown), which is connected to casing-side electronics (not shown). However, when the system is used for discontinuity detection as described herein, the changes in load in the antenna 113 are caused by changes in the pattern of magnetic field 360, or eddy currents induced in antenna 113 by magnetic field 360 as it is being influenced by discontinuities in the well casing. Magnetic permeability of, eddy currents within, and electrical conductivity of the materials around the antenna (inside and outside) will all contribute to the load as seen by monitoring the current through the antenna. Processing device 312 can operate the system 300 to sense a discontinuity in the well casing by detecting a difference between the current generated in the antenna when the antenna is proximate to the discontinuity and the current generated in the antenna when the antenna is not proximate to the discontinuity.

The same technique used herein for detecting discontinuities such as collar joints in the well-casing can also detect objects behind the well casing, such as the behind-casing electronics 114, to aid in placement of the tubing string. Additionally, the technique can be made to work for casings that have minimal or no collar joints or when additional detection points are desired by adding a ring of copper or other conductive material surrounding the casing to be detected. Such a "shorting ring" will act as a one-turn, short circuited, secondary coil of a transformer, where the tubing-side antenna serves as the primary side. Such a shorting ring will provide a very distinct response in the tubing-side antenna. For purposes of this disclosure, a collar joint, a shorting ring, or any metallic or partially metallic object behind, in, on, or otherwise in proximity to the well-casing is considered a discontinuity that can be detected by the system without necessarily establishing a data connection other than the one used for communication uphole. A calculated position indication or an indication that a discontinuity is being sensed can be provided by processing device 312 for storage in memory device 314.

In the example above, the topside controller 310 includes a processing device 312 and a memory device 314. The processor device 312 can execute one or more operations for sensing a discontinuity in the well casing and controlling various devices to enable the sensing. The processing device 312 can execute instructions stored in the memory device 314 to perform the operations. The processing device 312 can include one processing device or multiple processing devices. Non-limiting examples of the processing device 312 include a Field-Programmable Gate Array ("FPGA"), an application-specific integrated circuit ("ASIC"), a microprocessor, etc. The memory device can also be operable to store a count of discontinuities encountered by the antenna. A device such as an FPGA or ASIC can also be used to implement other modules. Such a device may include computer program code such as computer program instructions 316 as part of its "wiring."

The processing device 312 can be communicatively coupled to the memory device 314. The non-volatile memory device 314 may include any type of memory device that retains stored information when powered off. Non-limiting examples of the memory device 314 include electrically erasable and programmable read-only memory ("EEPROM"), flash memory, or any other type of non-volatile memory. In some examples, at least some of the memory device 314 can include a non-transitory medium from which the processing device 312 can read instructions. A non-transitory computer-readable medium can include electronic, optical, magnetic, or other storage devices capable of providing the processing device 312 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which a computer processor can read instructions. The instructions can include processor-specific instructions generated by a compiler or an interpreter from code written in any suitable computer-programming language, including, for example, C, C++, C #, etc.

An operator may provide input to controller 310 of FIG. 3 using an input/output interface 390. An indication that a discontinuity has been sensed, a position indication, or a count of discontinuities can also be provided to an operator through the input/output interface. Input/output interface 390 can also be used by an operator to input information about the tubing string and well casing so that processing device 312 can set an appropriate frequency or range of frequencies for the AC voltage to be applied to antenna 113 by the signal generator in driver module 331. An input/output interface may be located either locally or remotely relative to the rest of the system. Any connections shown between a controller and other instruments or hardware throughout this disclosure can be made wirelessly and can be between components located remotely from each other through a direct or networked connection. Such a networked connection can include the Internet.

Figure 4:
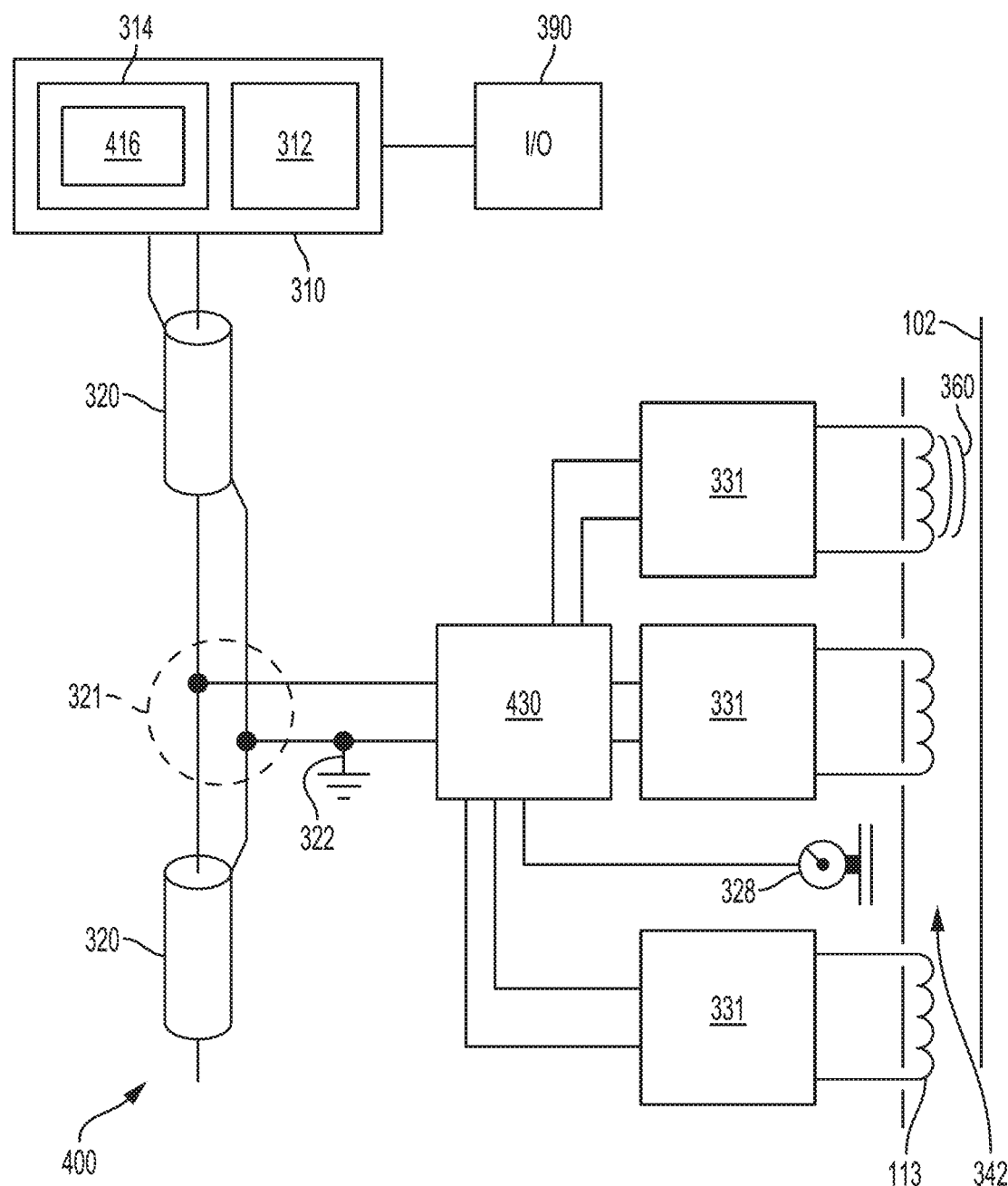
FIG. 4 is a block diagram of a system for sensing discontinuities in a well casing according to additional aspects.

FIG. 4 is a block diagram of a system 400 for sensing discontinuities in a well casing according to some aspects. System 400 is similar to system 300 of FIG. 3 in many respects, and like reference numbers refer to like elements in FIG. 3 and FIG. 4. System 400 of FIG. 4 includes multiple antennas 113 and multiple driver modules 331. System 400 of FIG. 4 includes the topside controller 310, which in turn includes a processing device 312 and a non-transitory memory device 314, in this case with computer program code instructions 416 for causing the processing device to control system 400 to carry out electronic sensing with multiple antennas 113. The tubing-side electronics of system 400 includes interface module 430 with electronics to interface with the TEC, electronics to interface with sensor 328, and electronics to interface with multiple driver modules 331. When multiple antennas are used, processing device 312 can monitor the current generated in each of the antennas and use this information to determine a direction of movement for the tubing string by detecting a difference in the current generated in at least two antennas at one time. The position relative to the casing can be more accurately determined with multiple antennas from the difference in signals from the individual antennas when located at a position where a transition of electric or magnetic properties are within the length of the antennas, even when the tubing string is not moving or moving slowly. The relative position will change as the tubing string moves because there is more than one measuring point. An appropriate indication of direction and position can be stored in memory device 314 and can be provided to an operator through the input/output interface 390.

The systems of FIG. 3 and FIG. 4 can be implemented in varying ways. The computer program code stored in memory device 314 can alternatively be stored within other parts of the system, for example, interface module 330 or 430. Interface module 330 and 430 can include an ASIC, an FPGA, or a microcontroller as the processing device. Firmware to implement aspects of this disclosure on system 300 or system 400 can be stored in memory that is part of a microcontroller or in a separate memory device that is part of the interface module. The frequency of operation of the system can be varied as previously described. The type of antenna used will depend on the chosen frequency of operation. In one example, the signal generator applies an AC voltage of 100 Hz to the antennas. The frequency of operation may be set by the processing device according to physical characteristics of the well casing, the tubing string, the formation, or other structures present. In some examples, the frequency of the AC voltage can be set as high as 100 kHz. A range of frequencies from 50 Hz to 150 Hz can be used. A range from 100 Hz to 100 kHz can also be used, in either case with antennas of appropriate size and design.

Figure 5:
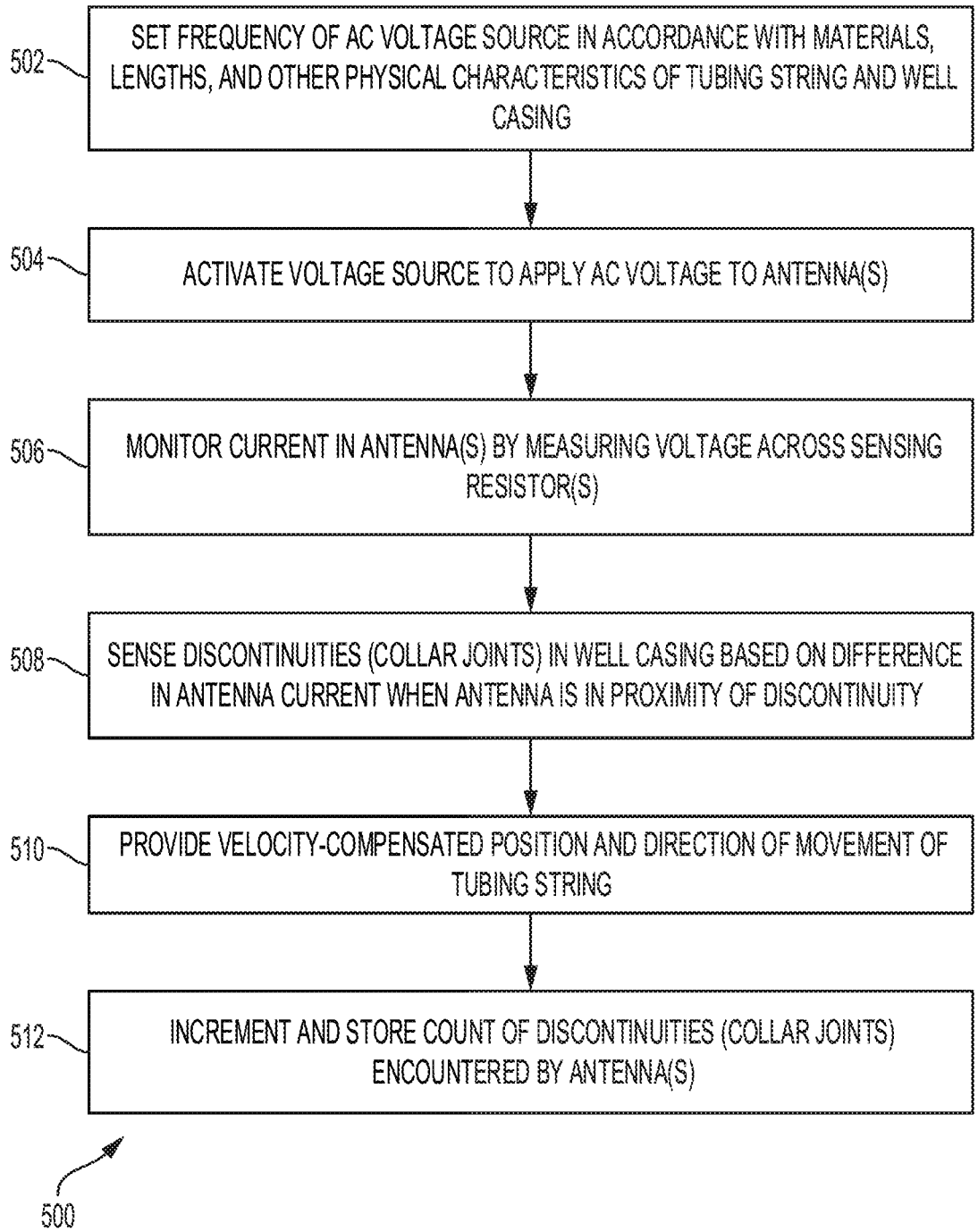
FIG. 5 is a flowchart illustrating a method of electronically sensing discontinuities in a well casing according to some aspects.

FIG. 5 is a flowchart illustrating a method 500 of electronically sensing discontinuities in a well casing according to some aspects. In this example, the method 500 includes operations performed by processing device 312 in controller 310 shown in FIG. 3 and FIG. 4. At block 502, processing device 312 sets the frequency of the signal generator used as an AC voltage source. The frequency is set in accordance with materials, lengths, and other physical characteristics of the tubing string and the well casing. At block 504, the voltage source is activated to feed the AC voltage to the antenna or antennas. At block 506, processing device 312 monitors the current in each antenna by measuring the voltage across a sensing resistor. At block 508, processing device 312 senses discontinuities, in this case, collar joints, in the well casing based on the difference in antenna current between when the antenna is in proximity to a collar joint when it is not in proximity to a collar joint. At block 510, a velocity-compensated position and a direction of the antennas are provided for storage in memory device 314 and optionally for display to an operator through input/output interface 390. At block 512, a count of collar joints is incremented and stored, in accordance with the number of collar joints sensed by the antennas of the system.

Unless specifically stated otherwise, it is appreciated that throughout this specification that terms such as "processing," "calculating," "determining," "operations," or the like refer to actions or processes of a computing device, such as the controller or processing device described herein, that can manipulate or transform data represented as physical electronic or magnetic quantities within memories, registers, or other information storage devices, transmission devices, or display devices. The order of the process blocks presented in the examples above can be varied, for example, blocks can be re-ordered, combined, or broken into sub-blocks. Certain blocks or processes can be performed in parallel. The use of "configured to" herein is meant as open and inclusive language that does not foreclose devices configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Elements that are described as "connected" or "connectable" can be connected directly or through intervening elements.

In some aspects, a system and method for sending discontinuities in a well casing is provided according to one or more of the following examples. As used below, any reference to a series of examples is to be understood as a reference to each of those examples disjunctively (e.g., "Examples 1-4" is to be understood as "Examples 1, 2, 3, or 4").

Example #1

A system includes an antenna mountable in or on a tubing string, a voltage source connectable to the antenna and a processing device connectable to the antenna and the voltage source. The processing device is operable to apply an AC voltage to the antenna using the voltage source, monitor a current generated in the antenna while the AC voltage is being applied to the antenna and while the tubing string is deployed within a well casing, sense a discontinuity in the well casing by detecting a difference between the current generated in the antenna when the antenna is proximate to the discontinuity and the current generated in the antenna when the antenna is not proximate to the discontinuity, and provide at least a relative position indication based on sensing the discontinuity.

Example #2

The system of example 1 further includes a current sensing component connectable to the antenna, and wherein the current generated in the antenna is monitored by measuring a voltage drop across the current sensing component.

Example #3

The system of example(s) 1-2 wherein the processing device is operable to control the voltage source to set a frequency of the AC voltage in accordance with a physical characteristic of the tubing string, the well casing, or both.

Example #4

The system of example(s) 1-3 wherein the processing device is operable to store a count of discontinuities encountered by the antenna.

Example #5

The system of example(s) 1-4 wherein the antenna includes a plurality of antennas, and wherein the processing device is operable to monitor a current generated in each of the plurality of antennas while the AC voltage is being applied and while the tubing string is deployed within the well casing.

Example #6

The system of example(s) 1-5 wherein the processing device is operable to determine a direction of movement for the tubing string by detecting a difference in the current generated in at least two of the plurality of antennas.

Example #7

The system of example(s) 1-6 wherein the discontinuity includes at least one of a shorting ring or a collar joint.

Example #8

A method of sensing a discontinuity in a well casing includes applying an AC voltage to an antenna mounted in or on a tubing string, monitoring a current generated in the antenna while the AC voltage is being applied to the antenna and while the tubing string is deployed within the well casing, sensing the discontinuity in the well casing by detecting a difference between the current generated in the antenna when the antenna is proximate to the discontinuity and the current generated in the antenna when the antenna is not proximate to the discontinuity, and providing at least a relative position indication based on sensing the discontinuity.

Example #9

The method of example 8 wherein the current generated in the antenna is monitored by measuring a voltage drop across a current sensing component.

Example #10

The method of example(s) 8-9 further includes setting a frequency of the AC voltage in accordance with a physical characteristic of the tubing string, the well casing, or both.

Example #11

The method of example(s) 8-10 further includes storing a count of discontinuities encountered by the antenna.

Example #12

The method of example(s) 8-11 wherein the antenna includes a plurality of antennas, and the current generated in each of the plurality of antennas is monitored.

Example #13

The method of example(s) 8-12 further includes determining a direction of movement for the tubing string by detecting a difference in the current generated in at least two of the plurality of antennas.

Example #14

The method of example(s) 8-13 wherein the discontinuity includes at least one of a shorting ring or a collar joint.

Example #15

A system for sensing collar joints in a well casing includes an antenna mountable in or on a tubing string, a driver module connectable to the antenna, a transmission line connectable to the driver module, and a controller connectable to the transmission line. The controller is operable to apply an AC voltage to the antenna, monitor a voltage drop across a sensing resistor connected to the antenna while the tubing string is deployed within the well casing, sense a collar joint in the well casing by detecting a difference between the voltage across the sensing resistor when the antenna is proximate to the collar joint and the voltage across the sensing resistor when the antenna is not proximate to the collar joint, and provide at least a relative position indication based on sensing the collar joint.

Example #16

The system of example 15 wherein the controller is further operable to set a frequency of the AC voltage in accordance with the physical characteristics of the tubing string, the well casing, or both.

Example #17

The system of example(s) 15-16 wherein the controller is further operable to store a count of collar joints encountered by the antenna.

Example #18

The system of example(s) 15-17 wherein the antenna includes a plurality of antennas, and wherein the controller is operable to monitor the voltage across the sensing resistor for each of the plurality of antennas while the AC voltage is being applied and while the tubing string is deployed within the well casing.

Example #19

The system of example(s) 15-18 wherein the controller is operable to determine a direction of movement for the tubing string by detecting a difference in the voltage across the sensing resistor for at least two of the plurality of antennas.

Example #20

The system of example(s) 15-19 wherein the driver module includes a signal improvement filter.

The foregoing description of the examples, including illustrated examples, has been presented only for the purpose of illustration and description and is not intended to be exhaustive or to limit the subject matter to the precise forms disclosed. Numerous modifications, combinations, adaptations, uses, and installations thereof can be apparent to those skilled in the art without departing from the scope of this disclosure. The illustrative examples described above are given to introduce the reader to the general subject matter discussed here and are not intended to limit the scope of the disclosed concepts.

What is claimed is:

1. A system comprising:
   an antenna mountable in or on a tubing string;
   a voltage source connectable to the antenna; and
   a processing device connectable to the antenna and the voltage source, the processing device being operable to:
   apply an AC voltage to the antenna using the voltage source;
   monitor a current generated in the antenna while the AC voltage is being applied to the antenna and while the tubing string is deployed within a well casing that is positioned in a formation;
   sense a discontinuity in the well casing by detecting a difference between the current generated in the antenna when the antenna is proximate to the discontinuity and the current generated in the antenna when the antenna is not proximate to the discontinuity;
   control the voltage source to set a frequency of the AC voltage in accordance with a physical characteristic of the formation and a physical characteristic of the tubing string or the well casing; and
   provide at least a relative position indication based on sensing the discontinuity.

2. The system of claim 1 further comprising a current sensing component connectable to the antenna, and wherein the current generated in the antenna is monitored by measuring a voltage drop across the current sensing component.

3. The system of claim 1 wherein the processing device is further operable to store a count of discontinuities encountered by the antenna.

4. The system of claim 1 wherein the antenna comprises a plurality of antennas, and wherein the processing device is operable to monitor a current generated in each of the plurality of antennas while the AC voltage is being applied and while the tubing string is deployed within the well casing.

5. The system of claim 4 wherein the processing device is operable to determine a direction of movement for the tubing string by detecting a difference in the current generated in at least two of the plurality of antennas.

6. The system of claim 1 wherein the discontinuity comprises at least one of a shorting ring or a collar joint.

7. A method of sensing a discontinuity in a well casing, the method comprising:
   applying an AC voltage to an antenna mounted in or on a tubing string;
   monitoring a current generated in the antenna while the AC voltage is being applied to the antenna and while the tubing string is deployed within the well casing that is positioned in a formation;
   sensing the discontinuity in the well casing by detecting a difference between the current generated in the antenna when the antenna is proximate to the discontinuity and the current generated in the antenna when the antenna is not proximate to the discontinuity;
   control a voltage source to set a frequency of the AC voltage in accordance with a physical characteristic of the formation and a physical characteristic of the tubing string or the well casing; and
   providing at least a relative position indication based on sensing the discontinuity.

8. The method of claim 7 wherein the current generated in the antenna is monitored by measuring a voltage drop across a current sensing component.

9. The method of claim 7 further comprising storing a count of discontinuities encountered by the antenna.

10. The method of claim 7 wherein the antenna comprises a plurality of antennas, and the current generated in each of the plurality of antennas is monitored.

11. The method of claim 10 further comprising determining a direction of movement for the tubing string by detecting a difference in the current generated in at least two of the plurality of antennas.

12. The method of claim 10 wherein the discontinuity comprises at least one of a shorting ring or a collar joint.

13. A system for sensing collar joints in a well casing, the system comprising:
an antenna mountable in or on a tubing string;
a driver module connectable to the antenna;
a transmission line connectable to the driver module; and
a controller connectable to the transmission line, the controller operable to:
apply an AC voltage to the antenna;
monitor a voltage drop across a sensing resistor connected to the antenna while the tubing string is deployed within the well casing that is positioned in a formation;
sense a collar joint in the well casing by detecting a difference between the voltage across the sensing resistor when the antenna is proximate to the collar joint and the voltage across the sensing resistor when the antenna is not proximate to the collar joint;
control the controller to set a frequency of the AC voltage in accordance with a physical characteristic of the formation and a physical characteristic of the tubing string or the well casing; and
provide at least a relative position indication based on sensing the collar joint.

14. The system of claim 13 wherein the controller is further operable to store a count of collar joints encountered by the antenna.

15. The system of claim 13 wherein the antenna comprises a plurality of antennas, and wherein the controller is operable to monitor the voltage across the sensing resistor for each of the plurality of antennas while the AC voltage is being applied and while the tubing string is deployed within the well casing.

16. The system of claim 15 wherein the controller is operable to determine a direction of movement for the tubing string by detecting a difference in the voltage across the sensing resistor for at least two of the plurality of antennas.

17. The system of claim 13 wherein the driver module comprises a signal improvement filter.

* * * * *